UNITED STATES PATENT OFFICE.

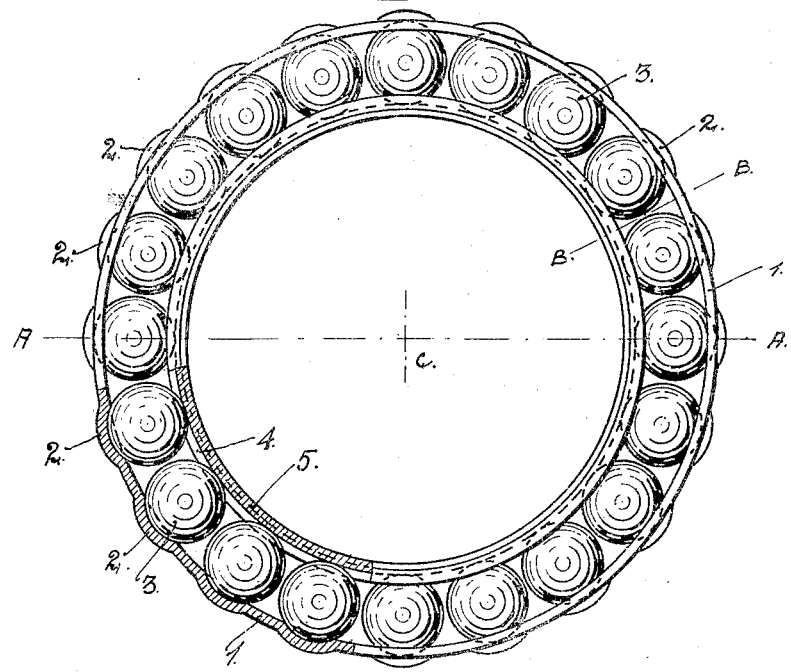
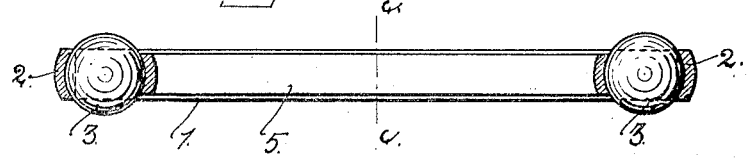
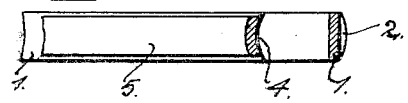

AXEL DANIELSSON, OF GOTTENBORG, SWEDEN, ASSIGNOR TO NORDISKA KULLAGER AKTIEBOLAGET, OF GOTTENBORG, SWEDEN.

BALL-CAGE FOR AXIAL-THRUST BALL-BEARINGS.

1,351,160.   Specification of Letters Patent.   Patented Aug. 31, 1920.

Application filed July 1, 1919. Serial No. 307,905.

*To all whom it may concern:*

Be it known that I, AXEL DANIELSSON, a subject of the King of Sweden, residing at Gottenborg, in the county of Gottenborg and Bohus and Kingdom of Sweden, have invented new and useful Improvements in Ball-Cages for Axial-Thrust Ball-Bearings, of which the following is a specification.

This invention refers to ball cages for axial thrust ball-bearings and has for its object to provide a ball cage adapted to withstand the considerable centrifugal forces set up in such cases especially in connection with large bearings designed for rotation at a high speed.

In such ball cages as hitherto used the withstanding of the centrifugal force from the balls at great speed has not been very effective, as the means to remedy this inconvenience, the provision of a ring outside the balls of such a dimension and solidity as to take up the above mentioned centrifugal force, caused a considerable increase in the cost of manufacture.

This invention is chiefly characterized therein, that the cage is composed of two rings the one positioned outside of the balls being provided to take up the centrifugal force upon the balls and for this purpose stiffened by means of spherical calottes or bosses conforming to the balls while the other ring arranged inside of the balls is provided with an annular and transversely curved shallow groove or race for the balls.

In the accompanying drawing a plan view of an embodiment of my invention is shown. Figure 1 shows the complete row of balls and their cage for an axial bearing partially in section, Fig. 2 an axial section along the line A—A in Fig. 1 and Fig. 3 a portion of an axial section along the line B—B in Fig. 1.

In the drawing 1 designates the outer ring of the ball-cage, stiffened by bosses 2 forming spherical calottes suited to fit the balls 3 and spaced at distances corresponding to the ball distances. By these bosses the balls 3 are held in position in the annular and shallow groove or race 4 in the inner ring 5.

The ring 5 must be of such a size and elasticity, that it may be forced down inside the balls 3, and the groove 4 must be of such a form as to prevent the balls from falling out of their places during the assembling of the bearing.

The bosses 2 may be given the same radius as the balls 3 or a somewhat larger one. The ring 5 advantageously might be split for instance like a piston ring, in order to facilitate the assembling of the bearing.

During operation the outer ring 1 will be carried along with the balls as the latter roll around the shaft because of the balls being guided by the spherical bosses 2, and the groove 4 in the ring 5 which permits this free rolling. The centrifugal force, meanwhile acts upon the common balls, and is taken up better by this improved outer ring than by a flat ring on account of the stiffening effect caused by means of the bosses 2, which make the ring stronger than a flat ring.

The improvement is not limited to the embodiment shown in the drawing, but can be varied in its details, without interfering with the idea of the invention.

Having now particularly described and ascertained the nature of my said invention, and in what manner the same is to be performed, what I claim as new and desire to secure by Letters Patent is:—

1. A ball bearing including a cage composed of an inner ring having a circumferential ball race in its outer periphery, an outer ring, a plurality of balls free to roll in the ball race and the outer ring being provided with spherical seats about its circumference to effect a proper spacing of the balls and to reduce the friction factor between the balls and cage rings to a minimum.

2. A ball bearing including a cage composed of an inner ring having a transverse groove extending about its circumference and forming a ball race, an outer ring provided at uniformly spaced intervals in its inner periphery with spherical calottes and a plurality of balls arranged between the rings, substantially as described.

In testimony whereof I have affixed my signature.

AXEL DANIELSSON.